(12) United States Patent
Hendrickson et al.

(10) Patent No.: US 6,308,379 B1
(45) Date of Patent: Oct. 30, 2001

(54) ERGO-DYNAMIC BUCKET

(76) Inventors: Floyd H. Hendrickson; Mary Hendrickson; Keith Hendrickson, all of 1408 N. University, Decatur, IL (US) 62526

( * ) Notice: Subject to any disclaimer, the term of this patent is extended or adjusted under 35 U.S.C. 154(b) by 0 days.

(21) Appl. No.: 09/644,660

(22) Filed: Aug. 24, 2000

(51) Int. Cl.⁷ .......................... B65D 25/28; B65D 17/32
(52) U.S. Cl. .................. 22/669; 220/DIG. 13; 220/763; 220/760
(58) Field of Search .......................... 220/669, DIG. 13, 220/756, 763, 760, 765–770

(56) References Cited

U.S. PATENT DOCUMENTS

| D. 291,612 | 8/1987 | Inui | D32/53 |
|---|---|---|---|
| D. 296,948 | 7/1988 | Fuller | D32/53 |
| 912,526 | * 2/1909 | Barr | 220/DIG. 13 |
| 1,009,691 | * 11/1911 | Raughtgan | 220/763 |
| 2,386,284 | * 10/1945 | Wynn | 220/763 |
| 2,896,809 | 7/1959 | Metzger et al. | 220/20 |
| 3,035,623 | 5/1962 | Goetz | 150/48 |
| 3,441,172 | * 4/1969 | Dike | 220/763 |
| 3,813,003 | * 5/1974 | Bernazzani | 220/763 |
| 4,014,452 | 3/1977 | Galer | 220/74 |

* cited by examiner

*Primary Examiner*—Joseph M. Moy
(74) *Attorney, Agent, or Firm*—Joseph H. McGlynn; Thomas Zack

(57) ABSTRACT

A liquid carrying container having a first outer semicircular concave wall and a second inner concave wall facing in the same direction. Both walls are joined together at matting side edges. The outer semicircular wall is considerably longer in length than the length of the inner second wall. The overall length of the upper rim of the first wall is approximately fifty percent greater is length than the length of the upper rim of the second wall. A recess in the inner wall forms a hand hold portion. Below this hand hold portion is a handle pivotally mounted to to the inner wall. The lower handle is formed by a U-shaped rod with two end pivot joints and a center covering cylindrical portion having a rod receiving hole along its length. This bucket construction provides a recess in the bucket's inner wall that allows a user's leg to be inserted to prevent contact with bucket's wall and lessen the possibility that is liquid contents may be tipped over.

5 Claims, 2 Drawing Sheets

ERGO-DYNAMIC BUCKET

BACKGROUND OF THE INVENTION

This invention relates to a bucket having a semi-circular shape and a hand hold near the top of the bucket and a pivoting handle near the bottom of the bucket.

Many types of buckets having different designs and configurations are known. For example, in one such earlier bucket the bucket is heart shaped. In another earlier bucket design the bucket has a hand hold near the top of the bucket.

One prior art bucket has a divider inside to present two buckets in one. Another container discloses a detachable handle. Still another plastic pail is disclosed with reinforcing around its rim.

DESCRIPTION OF THE PRIOR ART

Buckets, pails, containers and the like used to transport liquids and having different configurations and shapes are known. For example, U.S. Design Pat. No. 291,612 to Inue discloses a bucket that is heart shaped.

U.S. Design Pat. No. 296,948 to Fuller discloses a bucket with a hand hold near the top of the bucket.

U.S. Pat. No. 2,896,809 to Metzger et al. discloses a bucket with a divider inside to present two buckets in one.

U.S. Pat. No. 3,035,623 to Goetz discloses a container with a detachable handle.

U.S. Pat. No. 4,014,452 to Galer discloses a plastic pail with reinforcing around its rim.

In the present invention a bucket with a semicircular shape and a hand hold near the top of the bucket has a pivoting handle near the bottom of the bucket all as will be detailed in the specification that follows hereafter.

SUMMARY OF THE INVENTION

This invention relates to a bucket with a semicircular shape, a hand hold and a pivoting handle.

It is the primary object of the present invention to provide for a container for transporting liquids easier.

Another object is to provide for such a bucket that is semicircular in shape, has a top hand hold and a lower handle fixed to the bucket to assist in tipping and carrying the bucket.

These and other objects and advantages of the present invention will become apparent to readers from a consideration of the ensuing description and the accompanying drawings.

DESCRIPTION OF THE PREFERRED EMBODIMENT

Figure 1:
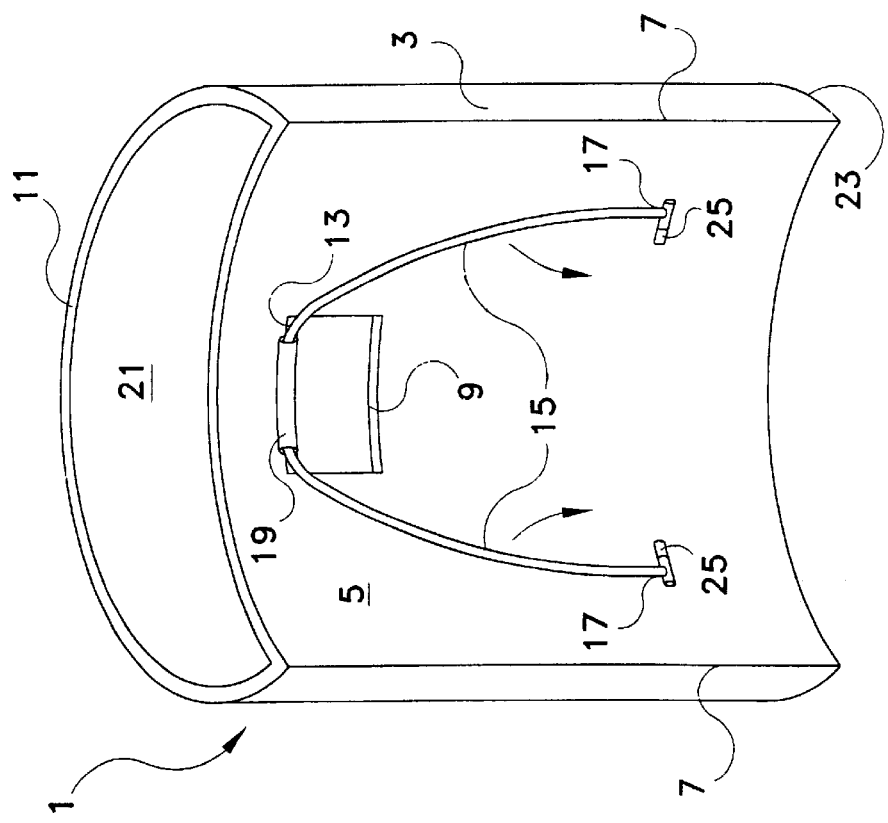
FIG. 1 is a perspective view of the present invention.

FIG. 1 is a perspective view of the present invention. The container or bucket 1 has a concave curved outer wall 3 joined at its two opposite side edges to an inner concave curved wall 5. Both walls are concave in the same direction and are joined along their four mating side edges 7. The curvature of the outer wall 3 is substantially less than the curvature of the inner wall 5. This means the outer wall 3 is substantially longer along the length of wall 3 than inner wall 5 is along the length of wall 5. In one embodiment the outer wall was about 50 percent longer than the inner wall.

The primary carrying point for the bucket 1 is an upper hand hold portion 9 located just below the upper rim 11. Rim 11 goes completely around both walls 3 and 5 with the rim segment on wall 3 being considerably, about 50 percent, longer than the rim segment on wall 5. Hand hold portion 9 is a rectangular shaped recess into wall 5 having a upper lip 13 which slightly overhangs from the wall surface 5. Near the bottom of wall 5 and mostly below portion 9 is a generally U-shaped rod 15 forming part of the handle. The two opposite free ends 17 of rod 15 are fixed into the wall 5 by fasteners 25.

At approximately the mid length of rod 15 is a rod mounted portion 19 that a user may used to move the rod 15. Along with the rod, portion 19 forms a handle. Portion 19 is shaped like a cylinder with a hole running its length to accommodate the cylindrically shaped rod 15 inserted lengthwise into the hole. The formed handle is pivotally attached to the container 1 at its ends 17 and acts to provide a secondary hand engagement surface, the recess portion 9 being the primary hand carrying surface. By grabbing handle portion 19 and portion 9, the bucket 1 may be tipped to have its liquid contents to emptied. The top 21 of the bucket 1 is normally opened while a bottom surface 23 extends between the lower edges of walls 3 and 5 to form a closed lower container surface.

Figure 2:
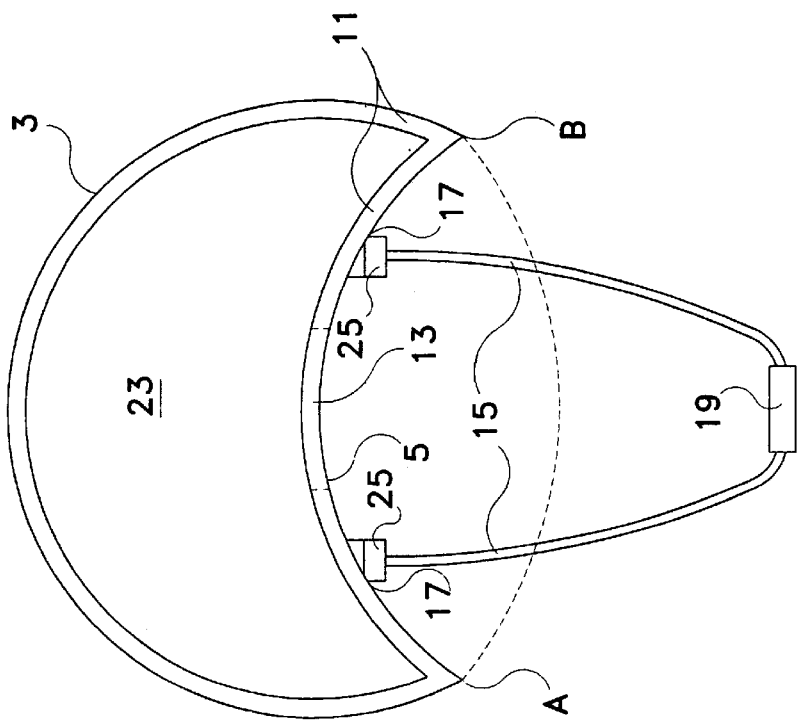
FIG. 2 is a top view of the FIG. 1 invention showing the handle attached to the bucket.

FIG. 2 is a top view of the FIG. 1 invention showing the handle portion 19 on rod 15 attached at its two ends 17 to the bucket. In this view the wall 3 is shown to have a semicircular shape with the smaller arc segment formed by wall 5 being considerably less in overall length. The bucket's bottom surface 23 is shown extending between the two joined side concave walls 3 and 5 to form the continuous lower closed surface. The volume formed between the two walls and this bottom surface is used to retain liquids placed in the bucket 1.

Appropriate conventional end fasteners 25 are used to fix the supporting rod 15 adjacent its two opposite free ends 17 into the bucket's wall 5. The end fasteners 25 include pivot joints to permit the handle, portion 19 and its support rod 15, to be bent down closer to the surface of wall 5, as shown by the arrows in FIG. 1. In a conventional round bucket the arc segment on the ends of wall 5 between points A and B would be curved outwardly (convex), as shown by the dotted lines, and stick out thereby increasing the likelihood that a user's leg may contact the carried bucket and tip its liquid contents.

By providing for the concave wall 5 the likelihood of leg contact with the bucket is reduced by having more opened space between points A and B. The two walls 3 and 5 each have a desired wall thickness with the upper bucket rim 11 extending continuously around them at their top surfaces.

Figure 3:
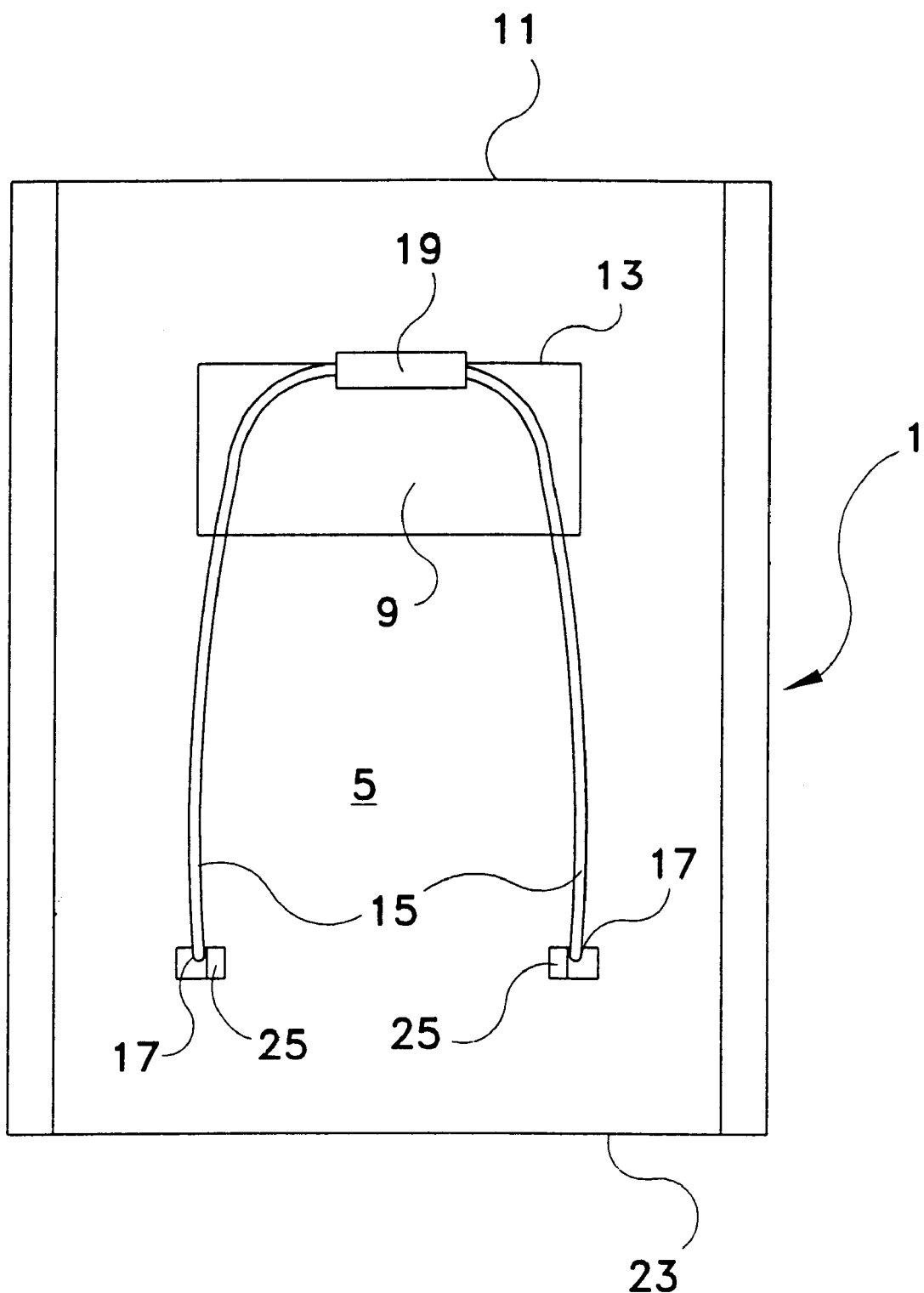
FIG. 3 is a front view of the FIGS. 1–2 invention.

FIG. 3 is a front view of the invention shown in FIGS. 1–2. In this view the relative positions of the upper hand hold portion 9 and the lower carrying/tipping handle portion 19 are shown. For example, in one embodiment the outer concave wall 3 (not shown in this figure, see FIGS. 1 and 2) had a rim segment 11 length of 33 inches while the lesser length wall 5 concave rim has a rim segment length of 22 inches. The overall height of the bucket 1 was 14 inches and the recessed hand hold portion 9 was located 3 inches below upper or top rim 11. This formed recess (9) was 6 inches long by 2 inches high with a ½ inch overhanging upper lip 13. In the same embodiment, the lower handle was approximately 2 inches up from the bottom surface 23 and could pivot to extend outwardly about 7 inches from wall 5. The handle's bent U-shaped supporting handle rod 15 was 24 inches long and the handle portion 19 overlapping its center portion was 5 inches long with a ½ inch center hole to receive the rod of a slightly less diameter.

Normally any number of composite of plastic, metal or other materials can be used to make the bucket 1. The bucket may be made in different sizes and in a great variety of colors and designs to suit the particular user's tastes. The volume of the liquid holding cavity formed between the walls 3 and 5 and the bottom surface 23 would be directly related to the selected size of the walls and bottom of the bucket.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A liquid carrying container comprising:

a first concave wall having an upper rim with a given length;

a second concave wall joined to said first concave walls at side edges of the second wall, said second concave wall being concaved in the same direction as the first concave wall and having an upper rim with a length considerably less than the given length of the first concave wall;

a bucket carrying hand hold portion mounted to said second concave wall below the upper rims of the first and second concave walls: and a lower handle mounted to said second wall below said hand hold portion.

2. The liquid carrying container as claimed in claim 1, wherein said hand hold portion includes a recess in the second concave wall.

3. The liquid carrying container as claimed in claim 2, wherein said lower handle is pivotally mounted to said second wall.

4. The liquid carrying container as claimed in claim 3, wherein said lower handle includes a U-shaped rod with pivot joints at the ends of the rod joining the rod to the second wall.

5. The liquid carrying container as claimed in claim 4, wherein the upper rim of the first concave wall is approximately fifty percent greater is length than the length of the upper rim of the second concave wall.

\* \* \* \* \*